United States Patent
Liu et al.

(10) Patent No.: US 12,269,490 B2
(45) Date of Patent: Apr. 8, 2025

(54) AUTONOMOUS VEHICLE SIMULATED MILEAGE DATA COLLECTION-GUIDED OPERATIONAL DESIGN DOMAIN TESTING AND TEST GENERATION

(71) Applicant: GM CRUISE HOLDINGS LLC, San Francisco, CA (US)

(72) Inventors: Yufeng Liu, Moraga, CA (US); Jing Lu, San Francisco, CA (US); Kevin Li, Boston, MA (US); Benjamin Guihaire, Santa Cruz, CA (US); Tai Stillwater-Moon, San Francisco, CA (US); Riccardo Pavesi, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 117 days.

(21) Appl. No.: 18/339,367

(22) Filed: Jun. 22, 2023

(65) Prior Publication Data

US 2024/0425064 A1 Dec. 26, 2024

(51) Int. Cl.
*B60W 50/06* (2006.01)
*B60W 60/00* (2020.01)
*G07C 5/02* (2006.01)

(52) U.S. Cl.
CPC ........ *B60W 50/06* (2013.01); *B60W 60/0013* (2020.02); *B60W 60/0015* (2020.02); *G07C 5/02* (2013.01); *B60W 2555/20* (2020.02); *B60W 2556/45* (2020.02)

(58) Field of Classification Search
CPC ............. B60W 50/06; B60W 60/0015; B60W 60/0013; B60W 2556/45; B60W 2555/20; G07C 5/02
See application file for complete search history.

(56) References Cited

U.S. PATENT DOCUMENTS

| 2021/0191407 A1* | 6/2021 | Benisch | G06N 20/00 |
| 2021/0347372 A1* | 11/2021 | Bagschik | G06V 20/56 |
| 2023/0356733 A1* | 11/2023 | Lau | B60W 50/06 |

* cited by examiner

*Primary Examiner* — Basil T. Jos
*Assistant Examiner* — Jay Khandpur

(57) ABSTRACT

Disclosed are embodiments for facilitating autonomous vehicle simulated mileage data collection-guided operational design domain testing and test generation. In some aspects, an embodiment includes receiving performance results corresponding to simulated mileage accumulation of simulated autonomous vehicles (AVs); determining, from the performance results, performance metrics and corresponding confidence intervals for the performance metrics; identifying at least one of the performance metrics that does not satisfy a performance metric threshold or at least one of the corresponding confidence intervals that does not satisfy a confidence interval threshold; determining an identified domain corresponding to the at least one of the performance metrics or the at least one of the corresponding confidence intervals; and causing at least one of on-road supervised driving of one or more AVs to be initiated or one or more synthetic tests to be generated in accordance with the identified domain.

20 Claims, 8 Drawing Sheets

300

Receive performance results corresponding to simulated mileage accumulation of simulated AVs
310

Determine, from the performance results, performance metrics and corresponding confidence intervals for the performance metrics
320

Identify at least one of the performance metrics that does not satisfy a performance metric threshold or at least one of the corresponding confidence intervals that does not satisfy a confidence interval threshold
330

Determine an identified domain corresponding to the at least one of the performance metrics or the at least one of the corresponding confidence intervals
340

Cause at least one of on-road supervised driving of one or more AVs to be initiated or synthetic tests to be generated in accordance with the identified domain
350

Analyze scenarios corresponding to received performance metrics
410

Arrange analyzed scenarios into groups based on different dimensions of one or more domains
420

Determine one or more determined groups of the groups that have corresponding poor performance metrics and/or low confidence intervals
430

Provide identified domains corresponding to the determined groups to guide subsequent on-road supervised testing and test generation for AVs in a particular ODD
440

FIG. 4

AUTONOMOUS VEHICLE SIMULATED MILEAGE DATA COLLECTION-GUIDED OPERATIONAL DESIGN DOMAIN TESTING AND TEST GENERATION

BACKGROUND

1. Technical Field

The disclosure generally relates to the field of processing systems and, more specifically, to autonomous vehicle simulated mileage data collection-guided operational design domain testing and test generation.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 3 illustrates an example method implementing AV simulated mileage data collection-guided ODD testing and test generation, in accordance with embodiments herein;

FIG. 4 illustrates an example method implementing domain identification as part of AV simulated mileage data collection-guided ODD testing and test generation, in accordance with embodiments herein;

DETAILED DESCRIPTION

Figure 1:
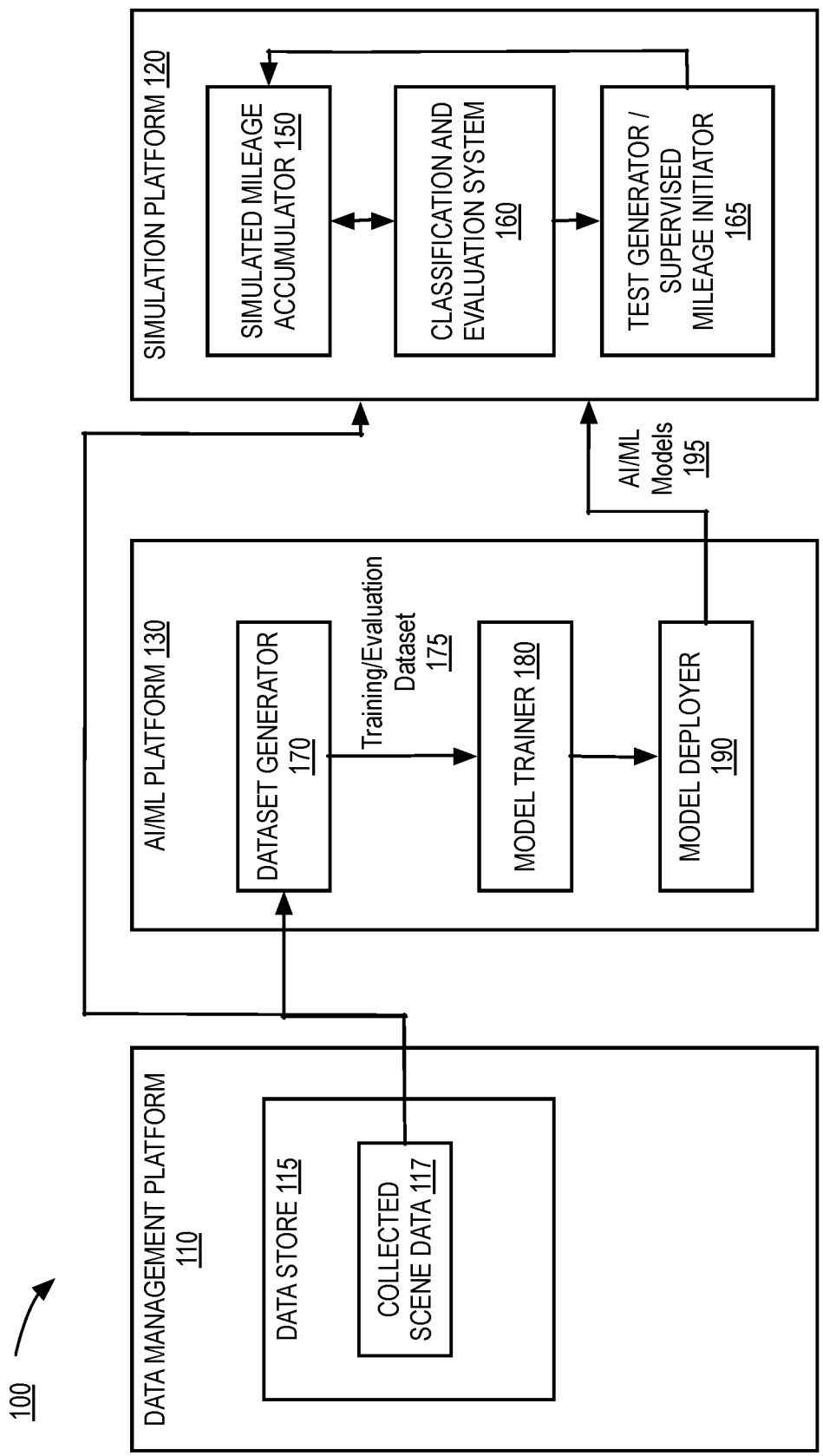
FIG. 1 is a block diagram of an example system illustrating autonomous vehicle (AV) simulated mileage data collection-guided operational design domain (ODD) testing and test generation, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models for various purposes. One use of ML-based models is to autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as deep learning (also known as deep structured learning). Deep learning is part of a broader family of machine learning methods based on artificial neural networks with representation learning. The learning can be supervised, semi-supervised, or unsupervised, and may be trained using real-world image data and/or image data generated in a simulated environment that have been labeled according to "correct" outputs of one or more perception functions (e.g., segmentation, classification, and/or tracking) of the AV.

Performance of the trained ML-based models may be evaluated by simulating the AV ML-based models using various different simulated scenarios. A scenario may refer to one or more elements of an environment in which the AV operates, such as road/intersection type, time, weather, road participants (e.g., other vehicles, bikes, pedestrians, etc.), and so on. Advancements in graphics and simulation technology have increased the use of simulated data for training and validating machine learning models, especially for tasks where real world data is costly or impossible to acquire. In particular, training visual detection and understanding algorithms on synthetic (simulated or sim) image data can produce immense gains for a robotic system as it does not incur the expense/impossibility of validation using real world data while providing a plethora of different scenarios.

With respect to the use of simulated data for training an AV, simulated mileage accumulation may be employed to collect data to improve the AVs' algorithm training capability, sensor accuracy, and road data quality. Simulated mileage accumulation may refer to virtual simulation of the AV software in order to project AV performance in a variety of distinct scenarios. For example, the simulated mileage accumulation can replicate a variety of driving environments and/or reproduce real-world scenarios from data captured by previous on-road operation of one or more AVs, including rendering geospatial information and road infrastructure (e.g., streets, lanes, crosswalks, traffic lights, stop signs, etc.); modeling the behavior of other vehicles, bicycles, pedestrians, and other dynamic elements; simulating inclement weather conditions, different traffic scenarios; and so on.

Simulated mileage accumulation can boost the speed of data collection to reach mileage accumulation targets while reducing fleet operation costs. In one illustrative example, if it is proposed that AVs should log 18 billion kilometers (11 billion miles) of road test data to reach an acceptable safety threshold, this would require a fleet of 100 vehicles running on roadways 24/7 at a constant speed of 40 kph (25 mph) for 5 years, resulting in unrealistic fleet operation costs. Simulated mileage accumulation provides a solution to this problem that enables continuous and unlimited data collection in the digital environment with relatively low operational costs. In addition, simulated mileage accumulation can have advantages in mileage data collection efficiency, road condition dataset diversity, and sensor corresponding data accuracy.

As AV organizations expand to new environments (e.g., cities, neighborhoods, etc.), these environments can naturally differ on dimensions ranging from road network topology, traffic pattern, road participant density, driver behavior, signage, traffic light orientation, and so on. In some implementations, these environments are referred to herein as operational design domains (ODDs). In lieu of large scale on-road supervised mileage accumulation in new ODDs, different approaches may be utilized to collect data for model training and performance validation. One such approach is to collect limited on-road mileage via supervised driving and further rely on simulation to accumulate mileage in order to project AV performance (safety, comfort, etc.) in a new ODD that has not been driven or road tested before. The scarcity in road mileage collection in this new ODD may utilize intelligent data gathering in order to not waste miles on similar/previously-seen/collected road segments. On the other hand, the generation of synthetic tests is a high-dimensional problem that cannot be solved via brute force enumeration and should also rely on continuous feedback.

To address these noted technical problems and challenges, embodiments herein provide AV simulated mileage data collection-guided ODD testing and test generation. Embodiments herein aim to utilize the insights from simulated mileage accumulation to influence both on-road supervised mileage accumulation as well as the creation of synthetic scenarios/tests in simulation to collect high-value, unseen data and test AV behaviors. In embodiments herein, the simulated results/predictions collected via simulated mileage accumulation include both expected performance and uncertainty measures (e.g., confidence intervals) with respect to AV performance relating to different scenarios (e.g., road/intersection type, time, weather, road participants, etc.). The expected performance and associated uncertainty from the simulated results/predictions can be utilized to guide both the limited on-road supervised testing (using fleet AVs) to be performed and the generation of relevant and unseen adversarial tests.

In embodiments herein, when the expected performance and associated uncertainty suggests that AV performance is poor and/or the performance uncertainty is high, further on-road supervised testing and/or test generation may be initiated in accordance with one or more identified domains having the poor performance and/or high performance uncertainty. These identified domains may include particular hazard areas, for example. The system may extract the semantics (e.g., description) of a scene/situation of the identified domain(s) and replicate those semantics via the on-road supervised testing and/or synthetic test generation. Embodiments herein allow for scaling to new ODDs with limited road testing budgets by leveraging performance level/model confidence/estimation uncertainty in simulated mileage accumulation in order to create a feedback system from simulated tests to road mileage accumulation via an integrated system.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of the approximately-paired simulation-to-real image translation of embodiments herein are further described below with respect to FIGS. 1-8.

FIG. 1 is a block diagram of an example system 100 illustrating AV simulated mileage data collection-guided ODD testing and test generation, in accordance with embodiments herein. In one embodiment, system 100 implements a simulation platform for providing AV simulated mileage data collection-guided ODD testing and test generation, as described further herein. The system 100 of FIG. 1 can be, for example, part of a data center that is cloud-based or otherwise. In other examples, the system 100 can be part of an AV or a human-operated vehicle having an advanced driver assistance system (ADAS) that can utilize various sensors including radar sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the system 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes one or more of a data management platform 110, a simulation platform 120, and an Artificial Intelligence/Machine Learning (AI/ML) platform 130, among other systems.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores scene data 117 collected, for example, from operation of one or more AVs. In some embodiments, scene data 117 may be training data provided from any source.

The simulation platform 120 can enable testing and validation of the algorithms, machine learning models, neural networks, and other development efforts for the AV, among other platforms and systems. The simulation platform 120 can replicate a variety of driving environments and/or reproduce real-world scenarios from data captured by the AV, including rendering geospatial information and road infrastructure (e.g., streets, lanes, crosswalks, traffic lights, stop signs, etc.); modeling the behavior of other vehicles, bicycles, pedestrians, and other dynamic elements; simulating inclement weather conditions, different traffic scenarios; and so on.

The AI/ML platform 130 can provide an infrastructure for training and evaluating machine learning algorithms for operating the AV, the simulation platform 120, and other platforms and systems. In one embodiment, the AI/ML platform 130 of system 100 may include a dataset generator 170, model trainer 180, and/or a model deployer 190. Using the dataset generator 170, model trainer 180, and/or the model deployer 190, data scientists can prepare data sets from the data management platform 110; select, design, and train machine learning models 195; evaluate, refine, and deploy the models 195; maintain, monitor, and retrain the models 195; and so on. For example, a training/evaluation dataset 175 generated by dataset generator 170 from collected scene data 117 can be used by model trainer 180 to train and/or evaluate an AI/ML model 195 that is to be deployed by model deployer 190. In one embodiment, model deployer 190 can deploy the AI/ML model 195 to simulation platform 120 for use as part of a simulated mileage accumulator 150.

In some embodiments, the simulation platform 120 is utilized to evaluate performance metrics (e.g., safety risks, comfort scores, remote assistance events, etc.) of simulated AVs implementing AI/ML models 195 in simulated scenarios. In embodiments herein, the simulation platform 120 can include a simulated mileage accumulator 150, a classification and evaluation system 160, and a test generator/supervised mileage initiator 165 to enable the AV simulated mileage data collection-guided ODD testing and test generation discussed herein. As previously noted, as AV organizations expand to new environments (e.g., cities, neighborhoods, etc.), these environments (sometimes referred to herein as ODDs) can naturally differ on dimensions ranging from road network topology, traffic pattern, road participant density, driver behavior, signage, traffic light orientation, and so on. In lieu of large scale on-road supervised mileage accumulation in new ODDs, the simulation platform 120 may include a simulated mileage accumulator 150 to simulate AV operation in order to collect data for model training and performance validation. Simulated mileage accumulator 150 may be employed to collect data to improve the AV's algorithm training capability, sensor accuracy, and road data quality. Simulated mileage accumulator 150 may provide virtual simulation of the AV software in order to project AV performance in a variety of distinct scenarios.

To address the challenges of expanding into new ODDs, embodiments herein provide AV simulated mileage data collection-guided ODD testing and test generation. In particular, embodiments can collect limited on-road mileage via supervised driving and further rely on simulation at simulated mileage accumulator 150 to accumulate mileage in order to project AV performance (safety, comfort, etc.) in a new ODD that has not been driven or road tested before.

The classification and evaluation system 160 of simulation platform 120 can utilize the results generated from simulated mileage accumulator 150 to influence both on-road supervised mileage accumulation, as well as the creation of new synthetic scenarios/tests in simulation, in order to collect high-value, unseen data and test AV behaviors. In embodiments herein, the simulated results/predictions collected at classification and evaluation system 160 via simulated mileage accumulator 150 may include both expected performance metrics (e.g., safety critical events (SCEs), etc.) and uncertainty measures (e.g., confidence intervals) with respect to AV performance relating to different scenarios.

The expected performance and associated uncertainty from the simulated results/predictions can be utilized by classification and evaluation system 160 to guide both future limited on-road supervised testing (e.g., using fleet AVs) to be performed and the generation of new relevant and unseen synthetic tests. For example, the classification and evaluation system 160 may identify one or more domains, such as particular hazard areas, geo-spatial specifications, weather types, interactions with other road participants, etc., where the expected performance is poor and/or the uncertainty is high. In some embodiments, thresholds may be in place to guide the determination of when expected performance is "poor" or uncertainty is "high".

The classification and evaluation system may provide the identified domains to the test generator/supervised mileage initiator 165 to guide initiation of on-road supervised testing and/or new synthetic test generation. In some embodiments, the test generator/supervised mileage initiator 165 can extract the semantics (e.g., description) of a scene/situation of the identified domain(s) and cause those semantics to be replicated via on-road supervised testing and/or synthetic test generation. Embodiments herein allow for scaling to new ODDs with limited road testing budgets by leveraging performance level/model confidence/estimation uncertainty in simulated mileage accumulation in order to create a feedback system from simulated tests to road mileage accumulation via an integrated system. Further details of the AV simulated mileage data collection-guided ODD testing and test generation as described below with respect to FIG. 2.

Figure 2:
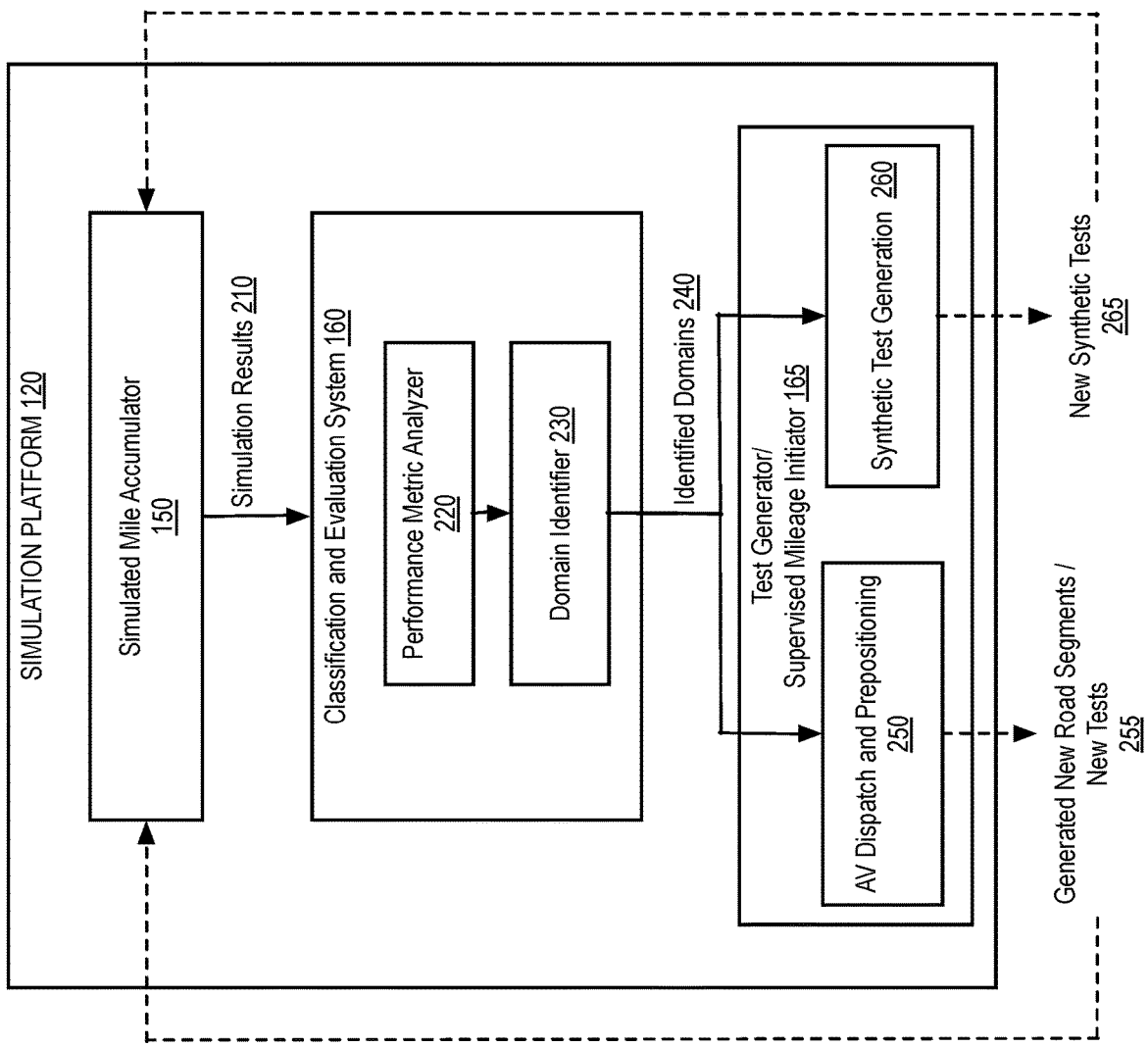
FIG. 2 is a block diagram of a detailed view of an example simulation platform providing for AV simulated mileage data collection-guided ODD testing and test generation, in accordance with embodiments herein.

FIG. 2 is a block diagram of a detailed view of an example simulation platform, such as simulation platform 120 of FIG. 1, providing for AV simulated mileage data collection-guided ODD testing and test generation, in accordance with embodiments herein. In one embodiment, simulation platform 120 of FIG. 3 is the same as simulation platform 120 described with respect to FIG. 1.

In one embodiment, simulation platform 120 includes simulated mileage accumulator 150, classification and evaluation system 160, and test generator/supervised mileage initiator 165, which may be the same as their identically-named counterparts described with respect to FIG. 1. As previously noted, the simulation platform 120 is utilized to evaluate performance metrics (e.g., safety risks, comfort scores, remote assistance events, etc.) of simulated AVs implementing AI/ML models in simulated scenarios.

In embodiments herein, the simulation platform 120 can include a simulated mileage accumulator 150, a classification and evaluation system 160, and a test generator/supervised mileage initiator 165 to enable the AV simulated mileage data collection-guided ODD testing and test generation discussed herein. The simulated mileage accumulator 150 can simulate AV operation in order to collect data for model training and performance validation. Simulated mileage accumulator 150 may be employed to collect data to improve the AV's algorithm training capability, sensor accuracy, and road data quality. Simulated mileage accumulator 150 may provide virtual simulation of the AV software in order to project AV performance in a variety of distinct scenarios.

Embodiments herein can collect limited on-road mileage via supervised driving and further rely on simulation at simulated mileage accumulator 150 to accumulate mileage in order to project AV performance (e.g., safety, comfort, etc.) in a new ODD that has not been driven or road tested before. The classification and evaluation system 160 of simulation platform 120 can utilize the simulation results 210 generated from simulated mileage accumulator 150 to influence both on-road supervised mileage accumulation, as well as the creation of new synthetic scenarios/tests in simulation, in order to collect high-value, unseen data and test AV behaviors. As such, the classification and evaluation system 160 is a system that evaluates AV performance in simulation and classifies ODD similarity and the associated AV behavior that allows engineers/systems to effectively identify novel ODDs that require additional testing and validation.

In one embodiment, the classification and evaluation system 160 may include a performance metric analyzer 220 and a domain identifier 230. The simulated results 210 may be collected at performance metric analyzer 220 for analysis. The performance metric analyzer 220 determines one or more performance metrics from the simulated results. The one or more performance metrics may include, but are not limited to, SCEs, miles per SCE, vehicle retrieval events (VREs), miles per VREs, comfort scores, remote assistance events, miles per remote assistance events, and so on. The performance metric analyzer 220 may also determine an uncertainty measurement, also referred to herein as a confidence interval, for each of the determined performance metrics.

One example of the performance metric analyzer 220 determining a performance metric and corresponding uncertainty measurement is discussed as follows. The following example is but one approach to determining a performance metric and corresponding uncertainty measurement, and embodiments herein may encompass determining other types of performance metrics and uncertainty measurements. In the example, the performance metric analyzer 220 may analyze the simulation results 210 to estimate (project) miles per SCE and quantify the uncertainty of the projected miles per SCE. In the example, assume that the miles per SCE of AV Model 1 is to be estimated in a new ODD, referred to as ODD 1. In the example, the performance of an AV Model 2 in a previous ODD, referred to as ODD 2, can be used as a proxy for new ODD 1, where AV Model 2 is a different model of AV that AV Model 1 and is utilized as a proxy model for AV Model. As such, the estimation of miles per SCE for AV Model 1 can be shown as follows:

$$\mathrm{mi}/SCE_{ODD1, AV\,Model\,1} = \mathrm{mi}/SCE_{ODD1, AV\,Model\,2} * \text{correction factor}_{AV\,Model\,2\,to\,AV\,Model\,1}$$

In the example, a method to quantify the uncertainty or confidence interval estimation of the above estimation of miles per SCE for AV Model 1 may be performed as follows. IT is noted that the SCE rate (or SCE per mile) from the proxy model (of AV Model 2) is an unbiased estimate. Furthermore, the point estimate of mi/SCE is a biased estimate. Therefore, the example can focus on quantifying the uncertainty of the SCE per mile metric instead and reconstruct the confidence interval of miles per SCE in the end.

The following quantities are denoted to simplify the notation:

X: AV Model 2 on-road SCE per mile in previous ODD 2.
Y: AV Model 1 SCE per Mile in simulated mileage accumulator.
Z: AV Model 2 SCE per Mile in simulated mileage accumulator.
T: AV Model 1 on-road SCE per mile in new ODD 1.

As the performance of AV Model 2 in previous ODD 2 is used as a proxy for new ODD 1, the conversion from one ODD to another can be ignored.

Following the above estimation method, the on-road SCE per mile in new ODD 1 can be estimated using the following:

$$T = X \times \frac{Y}{Z}$$

As the three quantities of X, Y and Z are closely correlated, the overall confidence interval of T may be affected by such correlation. Using a Delta method, the variance of T can be derived as discussed below.

If it is assumed that $$T = h(X, Y, Z) = X \times \frac{Y}{Z},$$

then the variance is shown as $$\operatorname{Var}(T) = \nabla h^T \times \sum \times \nabla h,$$

where $\nabla h$ is the gradient of the function h and $\Sigma$ is the covariance matrix of (X, Y, Z).

As a result, the gradient of the function h, $\nabla h$, can be derived as:

$$\nabla h = \left[ \frac{Y}{Z}, \frac{X}{Z}, \frac{-XY}{Z^2} \right]$$

and its value can be computed using the point estimate of X, Y and Z. The remaining factors are utilized to complete the computation as shown as follows:

corr (X,Y): the correlation of between the on-road performance of AV Model 2 and the performance of AV Model 1 in simulated mileage accumulator.

corr (X,Z): the correlation of between the on-road performance of AV Model 2 and its corresponding performance in simulated mileage accumulator.

corr (Y,Z): the correlation of between the performance of AV Model 2 in VMA and the performance of AV Model 1 in simulated mileage accumulator.

In some embodiments, the measurements of the above correlations may be performed in a replay type of experiment. For example, if the on-road performance of AV Model 2 in certain scenarios is known, and a simulation replay for both AV Model 2 and AV Model 1 can be performed in the same scenario. As such, the corresponding simulation is performed and the correlation among those simulations is computed.

Referring back to FIG. 2, the expected performance and associated uncertainty measurements determined by performance metric analyzer 220 can be utilized by classification and evaluation system 160 to guide both (1) future limited on-road supervised testing (e.g., using fleet AVs) to be performed and (2) the generation of new relevant and unseen synthetic tests. In one embodiment, the domain identifier 230 can analyze the expected performance and associated uncertainty measurements in order to identify one or more domains 240 where the expected performance is poor and/or the uncertainty is high. A domain as discussed herein may refer to, for example, particular hazard areas, geo-spatial specifications, weather types, interactions with other road participants, and so on. In some embodiments, the domain identifier 230 may utilize determined thresholds to guide the determination of when expected performance is "poor" and/or uncertainty is "high".

In one embodiment, the domain identifier 230 may group the analyzed simulation results 210 (from performance metric analyzer 220) into specific, uniform groupings in accordance with the various types of dimensions (e.g., particular hazard areas, geo-spatial specifications, weather types, interactions with other road participants, and so on). In some embodiments, the domain identifier 230 may utilize a trained AI/ML model provided by an AI/ML platform, such as AI/ML platform 130 of FIG. 1, to perform the grouping of the analyzed simulation results. These groupings can then facilitate the identification of the domains (or sub-domains) at the domain identifier 230.

The classification and evaluation system may provide the identified domains 240 to the test generator/supervised mileage initiator 165 to guide initiation of on-road supervised testing and/or new synthetic test generation. In some embodiments, the test generator/supervised mileage initiator 165 can extract the semantics (e.g., description) of a scene/situation of the identified domain(s) and cause those semantics to be replicated via on-road supervised testing and/or synthetic test generation.

In one embodiment, the test generator/supervised mileage initiator 165 may perform a marginal value analysis that analyzes the marginal benefit of obtaining another mile or minute of on-road supervised driving as compared to accumulating such a mile or minute using the simulated mile accumulator 150. This marginal value analysis may take into consideration the current fleet of AVs available for on-road supervised driving as their current positions on the road. The test generator/supervised mileage initiator 165 may also utilize a pre-positioning technique to examine the marginal benefit (e.g., a supply hour) of utilizing an idle AV for on-road supervised driving for a particular replicated scenario (of an identified domain 240). Based on the marginal value analysis and pre-positioning technique, the test generator/supervised mileage initiator 165 may utilize an AV dispatch and prepositioning component 250 to cause new road segments of on-road supervised driving to be initiated for a set of new tests 255 in accordance with particular replicated semantics of a scenario (of an identified domain 240). In some embodiment, the AV dispatch and prepositioning component 250 may account for simulated AV performance. The AV dispatch and prepositioning component 250 may provide for an automatic system that measures and searches for, and collects AV performance on, road segments in new ODDs that fit the scenario description of an identified domain(s) 240 with either poor performance and/or high uncertainty.

Concurrently, the test generator/supervised mileage initiator 165 can cause synthetic test generation component 260 to generate new synthetic tests 265 in accordance with the particular replicated semantics of a scenario (of an identified domain 240). The synthetic test generation component 260 may provide an automatic system that searches for existing tests/road segments and/or creates synthetic tests (that are currently not in the simulated mile accumulator) that fit the scenario description of an identified domain(s) 240 with either poor performance and/or high uncertainty. The synthetic tests 265 are created by generating objects that are either extracted from on-road driving or are completely synthetically created, and the AV is expected to follow a path generated by the tested AV stack from a predetermined starting point to a predetermined ending point.

In some embodiments, the new synthetic tests 265 can be generated in concurrence with generated new road segments/new tests 255 (e.g., an "and" condition). In some embodiments, the test generator/supervised mileage initiator 165 may determine that either the generated new road segments/new tests 255 or the new synthetic tests 265 are to be initiated/generated (e.g., an "or" condition). As a result, embodiments of the simulation platform 120 described herein allow for scaling to new ODDs with limited road testing budgets by leveraging performance level/model confidence/estimation uncertainty in simulated mileage accumulation in order to create a feedback system from simulated tests to road mileage accumulation via an integrated system.

FIG. 3 illustrates an example method 300 implementing AV simulated mileage data collection-guided ODD testing and test generation, in accordance with embodiments herein. Although the example method 300 depicts a particular sequence of operations, the sequence may be altered without departing from the scope of the disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method 300 includes block 310 where performance results are received corresponding to simulated mileage accumulation of simulated AVs. In one embodiment, the performance results include AV operation statistics associated with one or more scenarios occurring the simulated mileage accumulation. At block 320, performance metrics and corresponding confidence intervals for the performance metrics are determined from the performance results. In one embodiment, the performance metrics are determined from the AV operation statistics of the simulated mileage accumulation. The performance metrics may include, but are not limited to, SCEs, miles per SCE, vehicle retrieval events (VREs), miles per VREs, comfort scores, remote assistance events, miles per remote assistance events, and so on.

Subsequently, at block 330, the system identifies at least one of the performance metrics that does not satisfy a performance metric threshold or at least one of the corresponding confidence intervals that does not satisfy a confidence interval threshold. In one embodiment, the performance metric threshold and the confidence interval threshold are pre-determined values. In some embodiments, an AI/ML model is used to identify the performance metrics that are performing poorly or the confidence intervals with high uncertainty.

Then, at block 340, an identified domain is determined that corresponds to the at least one of the performance metrics or the at least one of the corresponding confidence intervals. In one embodiment, the identified domain may be determined using one or more dimensions occurring in a scenario corresponding to the at least one of the performance metrics or the at least one of the corresponding confidence intervals. Lastly, at block 350, the system causes at least one of on-road supervised driving of one or more AVs to be initiated and/or synthetic tests to be generated in accordance with the identified domain.

FIG. 4 illustrates an example method 400 implementing domain identification as part of AV simulated mileage data collection-guided ODD testing and test generation, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where scenarios corresponding to received performance metrics are analyzed. Then, at block 420, the analyzed scenarios are arranged into groups based on different dimensions of one or more domain groups. Subsequently, at block 430, one or more determined groups of the groups that have corresponding poor performance metrics and/or low confidence intervals are determined. Lastly, at block 440, identified domains corresponding to the determined groups are provided to guide subsequent on-road supervised testing and test generation for AVs in a particular ODD.

Figure 5:
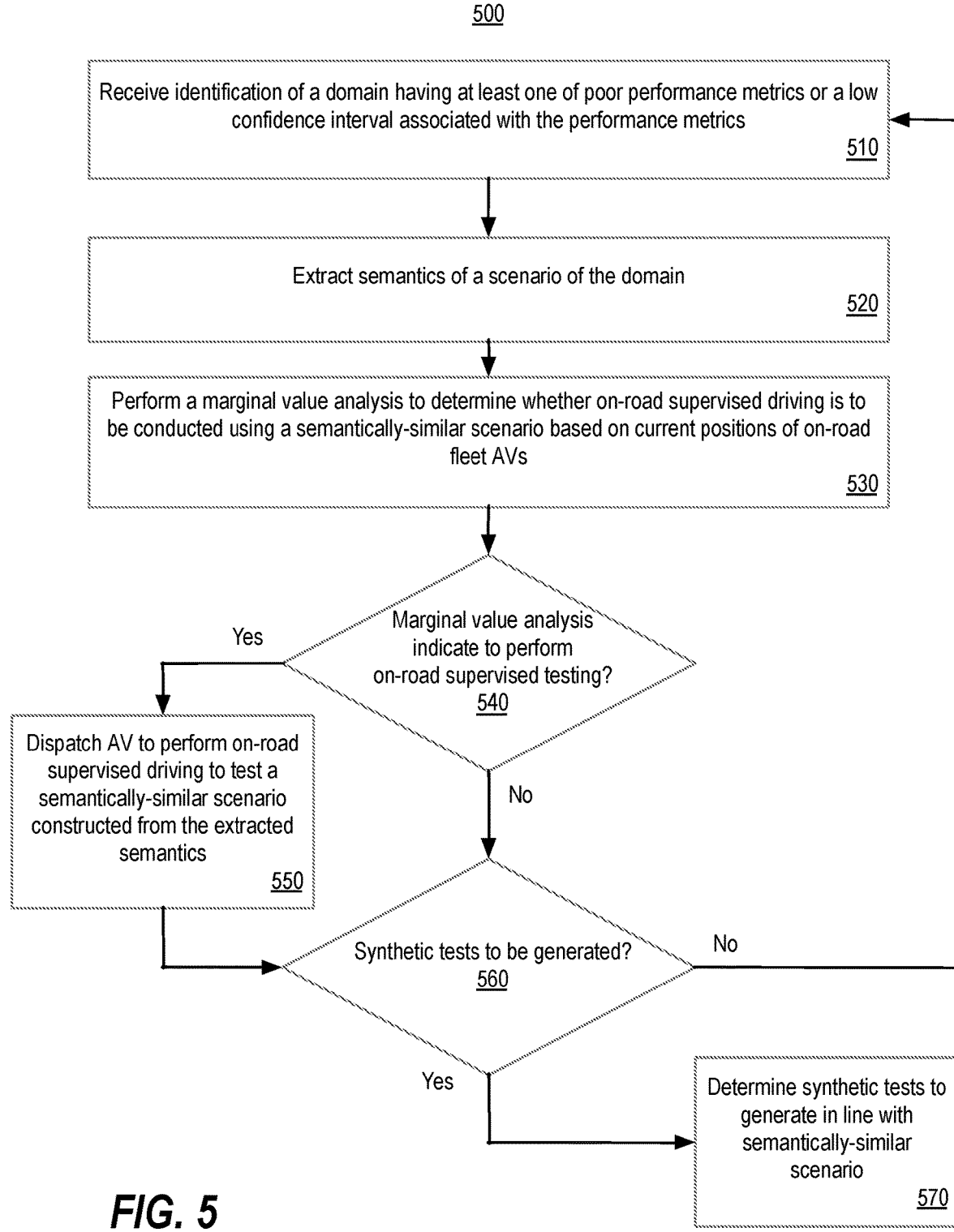
FIG. 5 illustrates an example method for implementing guided testing as part of implementing AV simulated mileage data collection-guided ODD testing and test generation, in accordance with embodiments herein.

FIG. 5 illustrates an example method 500 for implementing guided testing as part of implementing AV simulated mileage data collection-guided ODD testing and test generation, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where identification is received of a domain having at least one of poor performance metrics or a low confidence interval associated with the performance metrics. Then, at block 520, semantics of a scenario of the domain are extracted. At block 530, a marginal value analysis is performed to determine whether on-road supervised driving is to be conducted using a semantically-similar scenario based on current positions of on-road fleet AVs.

Then, at decision block 540, it is determined whether the marginal value analysis indicates that on-road supervised testing should be performed. In one embodiment, if the result of the marginal value analysis satisfies a marginal value benefit threshold, then the on-road supervised testing should occur and the method 500 proceeds to be block 550. At block 550, an AV is caused to be dispatched in order to perform on-road supervised driving to test a semantically-similar scenario constructed from the extracted semantics.

If the marginal value analysis does not satisfy the marginal value benefit threshold at decision block 540, then method 500 processing to decision block 560 where it is determined whether synthetic tests are to be generated. In one embodiment, the extracted semantics are compared to existing tests to determine whether any existing tests adequately test for situations having the extracted semantics. If no existing tests are found, then method 500 proceeds to block 570 where one or more synthetic tests are generated in line with a semantically-similar scenario to the scenario of the identified domain.

Figure 6:
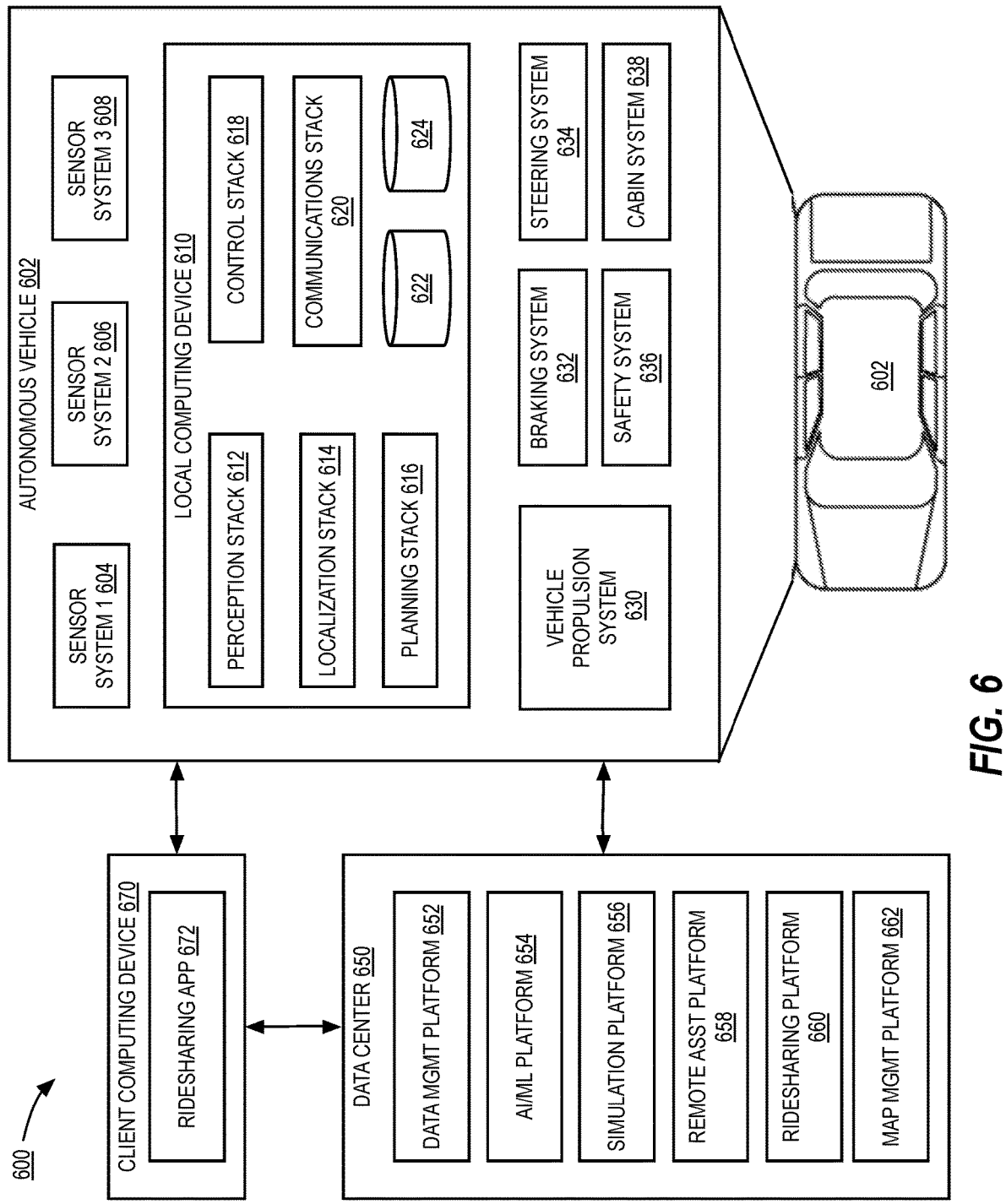
FIG. 6 illustrates an example system environment that can be used to facilitate AV dispatch and operations, according to some aspects of the disclosed technology.

Turning now to FIG. 6, this figure illustrates an example of an AV management system 600. In one embodiment, the AV management system 600 can implement autonomous vehicle simulated mileage data collection-guided operational design domain testing and test generation, as described herein. One of ordinary skill in the art will understand that, for the AV management system 600 and any system discussed in the disclosure, there can be additional or fewer components in similar or alternative configurations.

The illustrations and examples provided in the disclosure are for conciseness and clarity. Other embodiments may include different numbers and/or types of elements, but one of ordinary skill in the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/ permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models;

evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
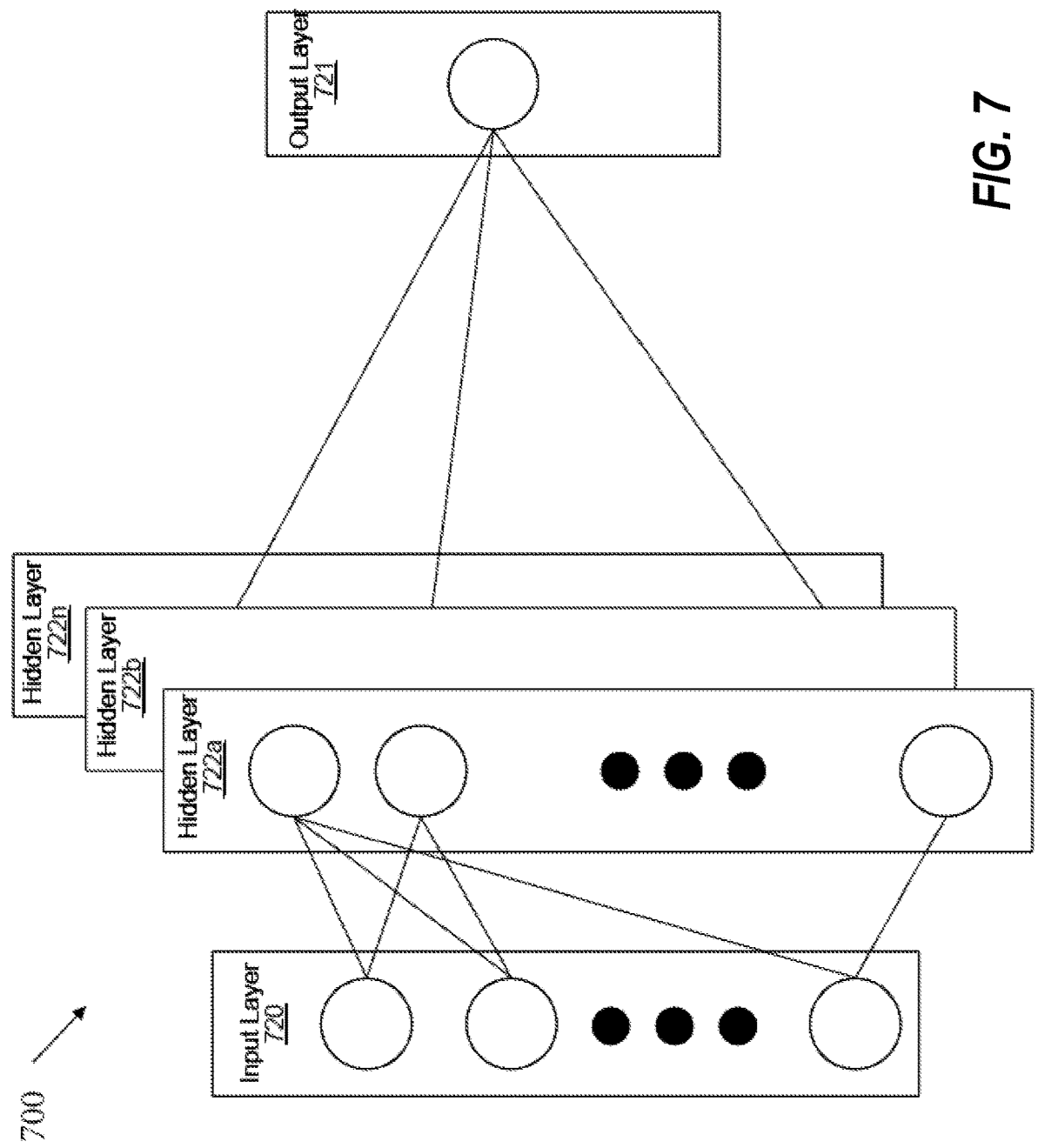
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722*a*. 722*b*, through 722*n*. The hidden layers 722*a*, 722*b*, through 722*n* include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722*a*, 722*b*, through 722*n*. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722*a*. For example, as shown, each of the input nodes of the input layer 720 is connected to each of the nodes of the first hidden layer 722*a*. The nodes of the first hidden layer 722*a* can transform the information of each input node by applying activation functions to the input node information. The information derived from the transformation can then be passed to and can activate the nodes of the next hidden layer 722*b*, which can perform their own designated functions. Example functions include convolutional, up-sampling, data transformation, and/or any other suitable functions. The output of the hidden layer 722*b* can then activate nodes of the next hidden layer, and so on. The output of the last hidden layer 722*n* can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $$E\_total = \sum\left(\frac{1}{2}(\text{target} - \text{output})^2\right).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
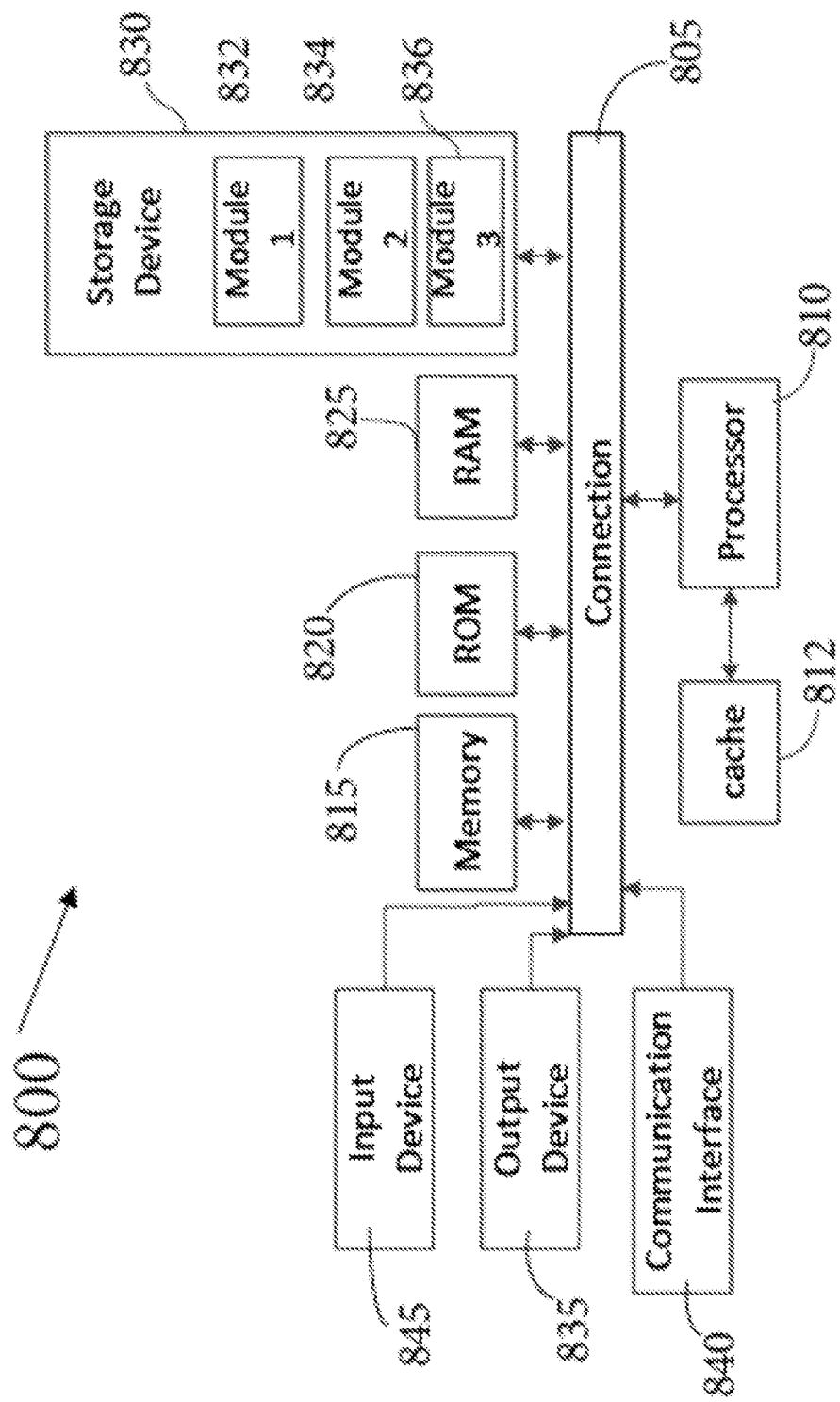
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/ plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a method for facilitating AV simulated mileage data collection-guided ODD testing and test generation, where the method comprises receiving, by a processing device, performance results corresponding to simulated mileage accumulation of simulated autonomous vehicles (AVs); determining, by the processing device from the performance results, performance metrics and corresponding confidence intervals for the performance metrics; identifying, by the processing device, at least one of the performance metrics that does not satisfy a performance metric threshold or at least one of the corresponding confidence intervals that does not satisfy a confidence interval threshold; determining, by the processing device, an identified domain corresponding to the at least one of the performance metrics or the at least one of the corresponding confidence intervals; and causing, by the processing device, at least one of on-road supervised driving of one or more AVs to be initiated or one or more synthetic tests to be generated in accordance with the identified domain.

In Example 2, the subject matter of Example 1 can optionally include wherein the on-road supervised driving and the one or more synthetic tests are generated for testing of an operational design domain (ODD) for AV operation. In Example 3, the subject matter of any one of Examples 1-2 can optionally include wherein the performance metrics comprise at least one of miles per safety critical event (SCE), SCEs, vehicle retrieval events (VREs), miles per VREs, comfort scores, remote assistance events, or miles per remote assistance events. In Example 4, the subject matter of any one of Examples 1-3 can optionally include wherein the identified domain comprises at least one of a hazard area, a geo-spatial specification, a weather type, or an interaction with other road participants.

In Example 5, the subject matter of any one of Examples 1-4 can optionally include wherein determining the identified domain further comprises: analyzing scenarios corresponding to the performance metrics to identify different dimensions of one or more domains occurring in the scenarios; grouping the scenarios into one or more groups based on the different dimensions; determining a first group of the one or more groups that is associated with the performance metrics that do not satisfy a performance metric threshold or the corresponding confidence intervals that do not satisfy a confidence interval threshold; and identifying a domain corresponding to the dimensions of the first group as the identified domain.

In Example 6, the subject matter of any one of Examples 1-5 can optionally include wherein causing the on-road supervised driving of one or more AVs to be initiated further comprises: extracting semantics of a scenario of the identified domain; performing a marginal value analysis to determine whether the on-road supervised driving should be conducted; and causing an AV to be dispatched to perform the on-road supervised driving to test a semantically-similar scenario constructed from the semantics.

In Example 7, the subject matter of any one of Examples 1-6 can optionally include wherein the marginal value analysis is based on current positions of on-road fleet AVs. In Example 8, the subject matter of any one of Examples 1-7 can optionally include wherein the marginal value analysis compares a first benefit of the on-road supervised driving to a second benefit of generating the one or more synthetic tests. In Example 9, the subject matter of any one of Examples 1-8 can optionally include wherein causing the one or more synthetic tests to be generated further comprises: extracting semantics of a scenario of the identified domain; and determining the one or more synthetic tests to generate based on a semantically-similar scenario constructed from the semantics.

Example 10 includes an apparatus for facilitating AV simulated mileage data collection-guided ODD testing and test generation, the apparatus of Example 10 comprising one or more hardware processors to: receive performance results corresponding to simulated mileage accumulation of simulated autonomous vehicles (AVs); determine, from the performance results, performance metrics and corresponding confidence intervals for the performance metrics; identify at least one of the performance metrics that does not satisfy a performance metric threshold or at least one of the corresponding confidence intervals that does not satisfy a confidence interval threshold; determine an identified domain corresponding to the at least one of the performance metrics or the at least one of the corresponding confidence intervals; and cause at least one of on-road supervised driving of one or more AVs to be initiated or one or more synthetic tests to be generated in accordance with the identified domain.

In Example 11, the subject matter of Example 10 can optionally include wherein the on-road supervised driving and the one or more synthetic tests are generated for testing of an operational design domain (ODD) for AV operation. In Example 12, the subject matter of Examples 10-11 can optionally include wherein the performance metrics comprise at least one of miles per safety critical event (SCE), SCEs, vehicle retrieval events (VREs), miles per VREs, comfort scores, remote assistance events, or miles per remote assistance events. In Example 13, the subject matter of Examples 10-12 can optionally include wherein the identified domain comprises at least one of a hazard area, a geo-spatial specification, a weather type, or an interaction with other road participants.

In Example 14, the subject matter of Examples 10-13 can optionally include wherein the one or more hardware processors to determine the identified domain further comprises the one or more hardware processors to: analyze scenarios corresponding to the performance metrics to identify different dimensions of one or more domains occurring in the scenarios; group the scenarios into one or more groups based on the different dimensions; determine a first group of the one or more groups that is associated with the performance metrics that do not satisfy a performance metric threshold or the corresponding confidence intervals that do not satisfy a confidence interval threshold; and identify a domain corresponding to the dimensions of the first group as the identified domain.

In Example 15, the subject matter of Examples 10-14 can optionally include wherein the one or more hardware processors to cause the on-road supervised driving of one or more AVs to be initiated further comprises the one or more hardware processors to: extract semantics of a scenario of the identified domain; perform a marginal value analysis to determine whether the on-road supervised driving should be conducted; and cause an AV to be dispatched to perform the on-road supervised driving to test a semantically-similar scenario constructed from the semantics.

Example 16 is a non-transitory computer-readable storage medium for facilitating AV simulated mileage data collection-guided ODD testing and test generation. The non-transitory computer-readable storage medium of Example 16 having stored thereon executable computer program instructions that, when executed by one or more processors, cause the one or more processors to: receiving, by the one or more processors, performance results corresponding to simulated mileage accumulation of simulated autonomous vehicles (AVs); determining, by the one or more processors from the performance results, performance metrics and corresponding confidence intervals for the performance metrics; identifying, by the one or more processors, at least one of the performance metrics that does not satisfy a performance metric threshold or at least one of the corresponding confidence intervals that does not satisfy a confidence interval threshold; determining, by the one or more processors, an identified domain corresponding to the at least one of the performance metrics or the at least one of the corresponding confidence intervals; and causing, by the one or more processors, at least one of on-road supervised driving of one or more AVs to be initiated or one or more synthetic tests to be generated in accordance with the identified domain.

In Example 17, the subject matter of Example 16 can optionally include wherein the performance metrics comprise at least one of miles per safety critical event (SCE), SCEs, vehicle retrieval events (VREs), miles per VREs, comfort scores, remote assistance events, or miles per remote assistance events. In Example 18, the subject matter of Examples 16-17 can optionally include wherein the identified domain comprises at least one of a hazard area, a geo-spatial specification, a weather type, or an interaction with other road participants.

In Example 19, the subject matter of Examples 16-18 can optionally include wherein determining the identified domain further comprises: analyzing scenarios corresponding to the performance metrics to identify different dimensions of one or more domains occurring in the scenarios; grouping the scenarios into one or more groups based on the different dimensions; determining a first group of the one or more groups that is associated with the performance metrics that do not satisfy a performance metric threshold or the corresponding confidence intervals that do not satisfy a confidence interval threshold; and identifying a domain corresponding to the dimensions of the first group as the identified domain.

In Example 20, the subject matter of Examples 16-19 can optionally include wherein causing the on-road supervised driving of one or more AVs to be initiated further comprises: extracting semantics of a scenario of the identified domain; performing a marginal value analysis to determine whether the on-road supervised driving should be conducted; and causing an AV to be dispatched to perform the on-road supervised driving to test a semantically-similar scenario constructed from the semantics.

Example 21 is a system for facilitating AV simulated mileage data collection-guided ODD testing and test generation. The system of Example 21 can optionally include a memory to store a block of data, and one or more hardware processors communicably coupled to the memory and are to: receive performance results corresponding to simulated mileage accumulation of simulated autonomous vehicles (AVs); determine, from the performance results, performance metrics and corresponding confidence intervals for the performance metrics; identify at least one of the performance metrics that does not satisfy a performance metric threshold or at least one of the corresponding confidence intervals that does not satisfy a confidence interval threshold; determine an identified domain corresponding to the at least one of the performance metrics or the at least one of the corresponding confidence intervals; and cause at least one of on-road supervised driving of one or more AVs to be initiated or one or more synthetic tests to be generated in accordance with the identified domain.

In Example 21, the subject matter of Example 20 can optionally include wherein the on-road supervised driving and the one or more synthetic tests are generated for testing of an operational design domain (ODD) for AV operation. In Example 22, the subject matter of Examples 20-21 can optionally include wherein the performance metrics comprise at least one of miles per safety critical event (SCE), SCEs, vehicle retrieval events (VREs), miles per VREs, comfort scores, remote assistance events, or miles per remote assistance events. In Example 23, the subject matter of Examples 20-22 can optionally include wherein the identified domain comprises at least one of a hazard area, a geo-spatial specification, a weather type, or an interaction with other road participants.

In Example 24, the subject matter of Examples 20-23 can optionally include wherein the one or more hardware processors to determine the identified domain further comprises the one or more hardware processors to: analyze scenarios corresponding to the performance metrics to identify different dimensions of one or more domains occurring in the scenarios; group the scenarios into one or more groups based on the different dimensions; determine a first group of the one or more groups that is associated with the performance metrics that do not satisfy a performance metric threshold or the corresponding confidence intervals that do not satisfy a confidence interval threshold; and identify a domain corresponding to the dimensions of the first group as the identified domain.

In Example 25, the subject matter of Examples 20-24 can optionally include wherein the one or more hardware processors to cause the on-road supervised driving of one or more AVs to be initiated further comprises the one or more hardware processors to: extract semantics of a scenario of the identified domain; perform a marginal value analysis to determine whether the on-road supervised driving should be conducted; and cause an AV to be dispatched to perform the on-road supervised driving to test a semantically-similar scenario constructed from the semantics.

Example 26 includes an apparatus comprising means for performing the method of any of the Examples 1-9. Example 27 is at least one machine readable medium comprising a plurality of instructions that in response to being executed on a computing device, cause the computing device to carry out a method according to any one of Examples 1-9. Example 28 is an apparatus for facilitating AV simulated mileage data collection-guided ODD testing and test generation, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
   receiving, by a processing device, performance results corresponding to simulated mileage accumulation of simulated autonomous vehicles (AVs);
   determining, by the processing device from the performance results, performance metrics and corresponding confidence intervals for the performance metrics;
   identifying, by the processing device, at least one of the performance metrics that does not satisfy a performance metric threshold or at least one of the corresponding confidence intervals that does not satisfy a confidence interval threshold;
   determining, by the processing device, an identified domain corresponding to the at least one of the performance metrics or the at least one of the corresponding confidence intervals; and
   causing, by the processing device, at least one of on-road supervised driving of one or more AVs to be initiated or one or more synthetic tests to be generated in accordance with the identified domain.

2. The method of claim 1, wherein the on-road supervised driving and the one or more synthetic tests are generated for testing of an operational design domain (ODD) for AV operation.

3. The method of claim 1, wherein the performance metrics comprise at least one of miles per safety critical event (SCE), miles per vehicle retrieval event (VRE), comfort scores, or miles per remote assistance event.

4. The method of claim 1, wherein the identified domain comprises at least one of a hazard area, a geo-spatial specification, a weather type, or an interaction with other road participants.

5. The method of claim 1, wherein determining the identified domain further comprises:
analyzing scenarios corresponding to the performance metrics to identify different dimensions of one or more domains occurring in the scenarios;
grouping the scenarios into one or more groups based on the different dimensions;
determining a first group of the one or more groups that is associated with the performance metrics that do not satisfy a performance metric threshold or the corresponding confidence intervals that do not satisfy a confidence interval threshold; and
identifying a domain corresponding to the dimensions of the first group as the identified domain.

6. The method of claim 1, wherein causing the on-road supervised driving of one or more AVs to be initiated further comprises:
extracting semantics of a scenario of the identified domain;
performing a marginal value analysis to determine whether the on-road supervised driving should be conducted; and
causing an AV to be dispatched to perform the on-road supervised driving to test a semantically-similar scenario constructed from the semantics.

7. The method of claim 6, wherein the marginal value analysis is based on current positions of on-road fleet AVs.

8. The method of claim 6, wherein the marginal value analysis compares a first benefit of the on-road supervised driving to a second benefit of generating the one or more synthetic tests.

9. The method of claim 1, wherein causing the one or more synthetic tests to be generated further comprises:
extracting semantics of a scenario of the identified domain; and
determining the one or more synthetic tests to generate based on a semantically-similar scenario constructed from the semantics.

10. An apparatus comprising:
one or more hardware processors to:
receive performance results corresponding to simulated mileage accumulation of simulated autonomous vehicles (AVs);
determine, from the performance results, performance metrics and corresponding confidence intervals for the performance metrics;
identify at least one of the performance metrics that does not satisfy a performance metric threshold or at least one of the corresponding confidence intervals that does not satisfy a confidence interval threshold;
determine an identified domain corresponding to the at least one of the performance metrics or the at least one of the corresponding confidence intervals; and
cause at least one of on-road supervised driving of one or more AVs to be initiated or one or more synthetic tests to be generated in accordance with the identified domain.

11. The apparatus of claim 10, wherein the on-road supervised driving and the one or more synthetic tests are generated for testing of an operational design domain (ODD) for AV operation.

12. The apparatus of claim 10, wherein the performance metrics comprise at least one of miles per safety critical event (SCE), miles per vehicle retrieval events (VREs), comfort scores, or miles per remote assistance events.

13. The apparatus of claim 10, wherein the identified domain comprises at least one of a hazard area, a geo-spatial specification, a weather type, or an interaction with other road participants.

14. The apparatus of claim 10, wherein the one or more hardware processors to determine the identified domain further comprises the one or more hardware processors to:
analyze scenarios corresponding to the performance metrics to identify different dimensions of one or more domains occurring in the scenarios;
group the scenarios into one or more groups based on the different dimensions;
determine a first group of the one or more groups that is associated with the performance metrics that do not satisfy a performance metric threshold or the corresponding confidence intervals that do not satisfy a confidence interval threshold; and
identify a domain corresponding to the dimensions of the first group as the identified domain.

15. The apparatus of claim 10, wherein the one or more hardware processors to cause the on-road supervised driving of one or more AVs to be initiated further comprises the one or more hardware processors to:
extract semantics of a scenario of the identified domain;
perform a marginal value analysis to determine whether the on-road supervised driving should be conducted; and
cause an AV to be dispatched to perform the on-road supervised driving to test a semantically-similar scenario constructed from the semantics.

16. A non-transitory computer-readable medium having stored thereon instructions that, when executed by one or more processors, cause the one or more processors to:
receiving, by the one or more processors, performance results corresponding to simulated mileage accumulation of simulated autonomous vehicles (AVs);
determining, by the one or more processors from the performance results, performance metrics and corresponding confidence intervals for the performance metrics;
identifying, by the one or more processors, at least one of the performance metrics that does not satisfy a performance metric threshold or at least one of the corresponding confidence intervals that does not satisfy a confidence interval threshold;
determining, by the one or more processors, an identified domain corresponding to the at least one of the performance metrics or the at least one of the corresponding confidence intervals; and
causing, by the one or more processors, at least one of on-road supervised driving of one or more AVs to be initiated or one or more synthetic tests to be generated in accordance with the identified domain.

17. The non-transitory computer-readable medium of claim 16, wherein the performance metrics comprise at least one of miles per safety critical event (SCE), miles per vehicle retrieval events (VREs), comfort scores, or miles per remote assistance events.

18. The non-transitory computer-readable medium of claim 16, wherein the identified domain comprises at least one of a hazard area, a geo-spatial specification, a weather type, or an interaction with other road participants.

19. The non-transitory computer-readable medium of claim 16, wherein determining the identified domain further comprises:
analyzing scenarios corresponding to the performance metrics to identify different dimensions of one or more domains occurring in the scenarios;
grouping the scenarios into one or more groups based on the different dimensions;
determining a first group of the one or more groups that is associated with the performance metrics that do not satisfy a performance metric threshold or the corresponding confidence intervals that do not satisfy a confidence interval threshold; and
identifying a domain corresponding to the dimensions of the first group as the identified domain.

20. The non-transitory computer-readable medium of claim 16, wherein causing the on-road supervised driving of one or more AVs to be initiated further comprises:
extracting semantics of a scenario of the identified domain;
performing a marginal value analysis to determine whether the on-road supervised driving should be conducted; and
causing an AV to be dispatched to perform the on-road supervised driving to test a semantically-similar scenario constructed from the semantics.

* * * * *